(12) United States Patent
Grodek et al.

(10) Patent No.: US 10,142,471 B2
(45) Date of Patent: Nov. 27, 2018

(54) SYSTEM AND METHOD FOR CALL PROGRESS DETECTION (71) Applicant: Genesys Telecommunications Laboratories, Inc., Daly City, CA (US)

(72) Inventors: Vera Grodek, Richmond Hill (CA); Gaurav Mehrotra, Markham (CA); Paul Gvildys, Toronto (CA); Nelson Shundo, Sao Paulo (BR); Alex Ka Yu Lee, Markham (CA)

( * ) Notice: Subject to any disclaimer, the term of this patent is extended or adjusted under 35 U.S.C. 154(b) by 388 days.

(21) Appl. No.: 14/846,643

(22) Filed: Sep. 4, 2015

(65) Prior Publication Data

US 2016/0261743 A1  Sep. 8, 2016

Related U.S. Application Data

(60) Provisional application No. 62/127,222, filed on Mar. 2, 2015.

(51) Int. Cl.
| | |
|---|---|
| *H04M 3/51* | (2006.01) |
| *G10L 25/51* | (2013.01) |
| *H04M 3/42* | (2006.01) |
| *H04M 3/533* | (2006.01) |
| *G10L 15/08* | (2006.01) |
| *G10L 15/12* | (2006.01) |
| *G10L 25/24* | (2013.01) |

(52) U.S. Cl.
CPC .......... *H04M 3/5158* (2013.01); *G10L 25/51* (2013.01); *G10L 15/12* (2013.01); *G10L 25/24* (2013.01); *G10L 2015/088* (2013.01); *H04M 3/42221* (2013.01); *H04M 3/53308* (2013.01); *H04M 2203/2027* (2013.01)

(58) Field of Classification Search
CPC .................................................. H04M 3/5158
See application file for complete search history.

(56) References Cited

U.S. PATENT DOCUMENTS

| | | | |
|---|---|---|---|
| 7,346,512 B2 * | 3/2008 | Li-Chun Wang | ........................... G06F 17/30743 704/270 |
| 8,681,950 B2 * | 3/2014 | Vlack | ............... G06F 17/30743 341/57 |
| 9,100,479 B2 | 8/2015 | Bouzid et al. | |

(Continued)

FOREIGN PATENT DOCUMENTS

| | | |
|---|---|---|
| JP | 20125145 A | 1/2012 |
| KR | 1020130131951 A | 12/2013 |

OTHER PUBLICATIONS

Lindasalwa Muda; Voice Recognition Algorithms using Mel Frequency Cepstral Coefficient (MFCC) and Dynamic Time Warping (DTW) Techniques; Journal of Computing, vol. 2, Issue 3, Mar. 2010, ISSN 2151-9617.

(Continued)

*Primary Examiner* — Joseph T Phan (57) ABSTRACT

A contact center includes an outbound server to make a call to a callee and a media device. The media device receives an audio signal based on the call, to determine a Mel-frequency cepstral coefficient for the received audio signal, and to match the Mel-frequency cepstral coefficient for the audio signal to a Mel-frequency cepstral coefficient for a prerecorded carrier message. The media device can determine a content of the audio signal based on the match.

23 Claims, 4 Drawing Sheets

(56) References Cited

U.S. PATENT DOCUMENTS

| | | |
|---|---|---|
| 9,620,105 B2* | 4/2017 | Mason ................... G10L 15/02 |
| 9,633,660 B2* | 4/2017 | Haughay ................ G10L 17/08 |
| 2009/0268882 A1 | 10/2009 | Lee et al. |
| 2009/0287489 A1 | 11/2009 | Savant |
| 2011/0307257 A1 | 12/2011 | Pereg et al. |
| 2013/0259211 A1 | 10/2013 | Vlack et al. |
| 2014/0065582 A1 | 3/2014 | Wyss et al. |
| 2014/0214676 A1 | 7/2014 | Bukai |

OTHER PUBLICATIONS

International Search Report and Written Opinion for International Application No. PCT/US2016/020281, dated Jun. 29, 2016, 16 pages.

Extended European Search Report for Application No. 16759365.6, dated Jan. 25, 2018, 8 pages.

* cited by examiner

SYSTEM AND METHOD FOR CALL PROGRESS DETECTION

CROSS-REFERENCE TO RELATED APPLICATION

This application claims the benefit of U.S. Provisional Application Ser. No. 62/127,222, filed Mar. 2, 2015, which is incorporated in its entirety herein.

BACKGROUND

Contact centers can process transactions and general servicing of customers and potential customers' needs. Modern contact centers can both receive calls and reach out to persons who may be existing or potential customers to elicit engagement of those persons in transaction and/or service-based processes, etc. hosted by the contact center. Calls made from the contact center can include telemarketing, sales or fund-raising calls, as well as calls for contact list updating, surveys or verification services, etc.

BRIEF DESCRIPTION OF THE DRAWINGS

In association with the following detailed description, reference is made to the accompanying drawings, where like numerals in different figures can refer to the same element.

DETAILED DESCRIPTION

Call progress detection determines the nature of a callee or the outcome of call setup to a network. The network can include a traditional telephony, Internet Protocol (IP) network, etc. When a call or session is being established, e.g. by a contact center, the caller or initiator at the contact center may be interested in knowing if somebody answered the call, if the line is busy, if the line is out of service, if the call is being transferred to an answering machine, etc. Session initiation protocol (SIP) signaling may not be offered by the network. From the network perspective, calls may proceed normally to the point of connection and then an answering machine, etc. Additionally, some of messages are things like "phone is closed" or "busy," that normal tones are not used, and neither is signaling.

Therefore, when the caller is an automated application, such as an automated dialer or message broadcasting system, a matching system and/or method described herein can be used to automatically classify the call, e.g., the call was answered, the line is busy, the line is out of service, the call is being forwarded to an answering machine, etc. In one implementation, the matching system can recognize determined carrier messages to categorize the call. For example, a contact center can distinguish carrier messages in a pre-connect stage of the call from an answering machine or human response in the connect stage, e.g., leveraging a Mel-frequency cepstral coefficient (MFCC).

Figure 1:
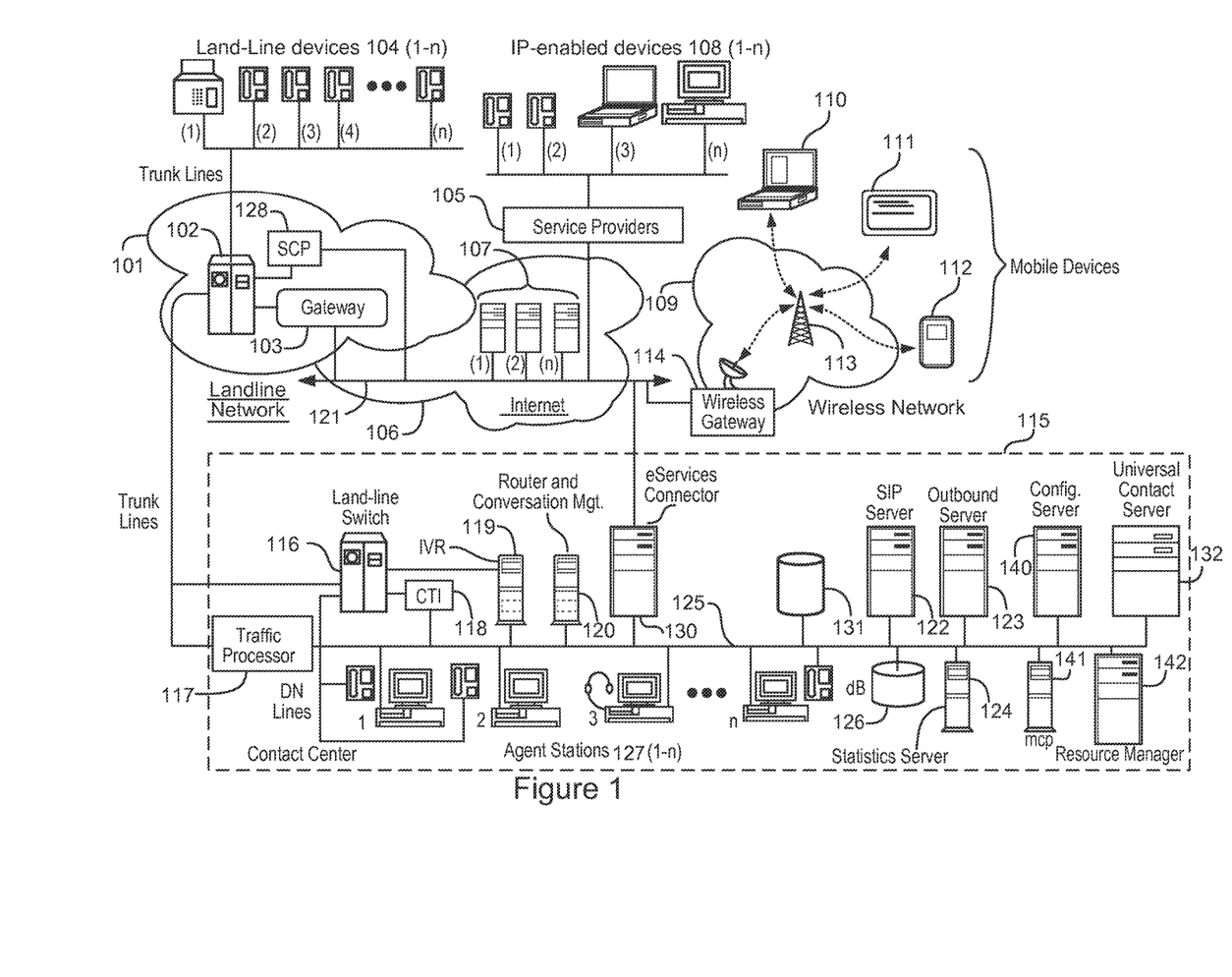
FIG. 1 is a block diagram illustrating an example contact center and a plurality of networks with interconnections whereby callees may interact with the contact center.

FIG. 1 is a block diagram illustrating an example contact center 115 and a plurality of networks with interconnections whereby callees may interact with the contact center 115. A matching system, e.g., including one or more of a database 131, a Session Initiation protocol (SIP) server 122, an outbound server 123, a configuration server 140, media control platform (MCP) 141, resource manager 142, implemented with or separate from the contact center 115, can determine a content of a carrier or other message, e.g., the line is busy, the call is being sent to voice mail, etc. The outbound server 123 may be used to manage outbound campaigns in the contact center 115. Calls may be made by the outbound server 123 to destination callees from a campaign list, and answered calls may be connected directly or be queued to be connected to agents involved in the outbound campaigns. The contact center 115 may wish to determine the content of a carrier or other message before connecting the call to a contact center agent. In one example, in this way the agent need not wait for a callee that may not be connected, e.g., because the line is busy or not in service, or the call is being sent to an answering machine, etc.

The resource manager 142 can obtain IVR profiles from a configuration server 140 to establish the matching The profiles can include enable/disable the matching functionality for determined customers, information to map carrier messages to results based on the customer, and to set a matching percentage as described below. The resource manager 142 can send relevant IVR profile parameters to the MCP 141, e.g., through the SIP request uniform resource identifier (URI).

The contact center 115 may be hosted by an enterprise and the enterprise may employ more than one contact center. In general, callees and agents may interact with contact center 115 through communication appliances such as land-line devices, e.g., telephones and facsimile machines 104 (1-n), IP-enabled devices 108 (1-n), through mobile appliances 110, 111 or 112, etc. Interactions may include voice, text interaction, email, messaging services, chat, facsimiles, and so on.

Persons interacting through land-line devices 104 may connect firstly over trunk lines as shown to a network switch 102. Switch 102 may interact with hardware and software of a Service Control Point (SCP) 128, which may execute intelligent operations to determine to connect a call to different ones of possible contact centers or to route a call to an agent in a contact center 115 or to an agent operating as a remote agent outside a contact center premises. Incoming calls in some circumstances may also be routed through a gateway 103 into the Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call via a land-line device 104 connecting to switch 102 may be routed to contact center 115 via trunk lines as shown to either a land-line switch 116 in contact center 115 or to a Traffic Processor 117. A contact center 115 may operate with the land-line switch or the traffic processor, but in some circumstances may employ both incoming paths. Traffic processor 117 may provide Session Border Control (SBC) functionality, may operate as a Media Gateway, or as a Softswitch.

Persons interacting through IP-enabled devices 108 (1-*n*) may interact through the Internet network via backbone 121, enabled by a variety of service providers 105 which operate to provide Internet service for such devices. Devices 102(1) and 102(2) may be IP-enabled telephones, operating under a protocol such as SIP protocol. Appliance 108(3) is illustrated as a lap-top computer, which may be enabled by software for voice communication over packet networks such as the Internet, and may also interact in many other ways, depending on installed and operable software, such as Skype™ or other VoIP solutions based on technologies such as WebRTC. Similarly appliance 108(*n*) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may include a variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which users may leverage in interaction with a contact center such as contact center 115.

Another arrangement by which users and agents may interact with contact centers is through mobile devices, illustrated in FIG. 1 by devices 110, 111 and 112. Such devices may include, but are not limited to laptop computers, tablet devices, telephones, etc. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur through individual ones of cell towers 113 associated with base stations having gateways such as gateway 114 illustrated, the gateways connected to Internet backbone 121.

In some circumstances mobile devices such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as potential customers of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram such as FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implements with a GENESYS TELECOMMINATION SYSTEMS, INC. T-server. Calls may be queued in any one of a variety of ways before connection to an agent, either locally-based or remote from the contact center, depending on circumstances.

Incoming land-line calls to switch 116 may also be connected to an IVR server 119, which may serve to ascertain purpose of the caller and other information useful in further routing of the call to final connection, if further routing is needed. A router and conversation manager server 120 may be leveraged for routing intelligence, of which there may be a great variety, and for association of the instant call with previous calls or future calls that might be made. The router and conversation manager server 120 can be mapped to a GENESYS TELECOMMINATION SYSTEMS, INC. orchestration routing server, a universal routing server (URS) and conversation manager.

Land-line calls thusly treated may be connected to agents at agent stations 127(1) or 127(2), each of which is shown as comprising a land-line telephone connected to switch 116 by destination number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127.

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112, and a wide variety of text-based electronic communications may come to contact center 115 through the Internet, arriving in the Contact Center at an eServices Connector 130. eServices Connector 130 may provide protective functions, such as a firewall may provide in other architecture, and may serve to direct incoming transactions to appropriate service servers. For example, SIP calls may be directed to SIP Server 122, and text-based transactions may be directed to an Interaction Server 131, which may manage email, chat sessions, Short Message Service (SMS) transactions, co-browsing sessions, and more.

Agent station 127(3) is illustrated as having a connected headset from a computing device, which may execute telephony software to interact with packet switched calls. Agent station 127(*n*) is illustrated as having an IP-enable telephone connected to LAN 125, through which an agent at that station may connect to packet-switched calls. Every agent station may have a computerized appliance executing software to enable the using agent to transact by voice, email, chat, instant messaging, and any other known communication process.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A database dB 126 may be provided to archive interaction data and to provide storage for many of the activities in contact center 115. The database 126, or a dedicated voice print database 131, can be used for storing voice prints as described below.

As described above, contact center 115, and the architecture and connectivity of the networks through which transaction is accomplished between callees and agents is exemplary, and there are a variety of ways that similar functionality might be attained with somewhat different architecture. The architecture illustrated is exemplary. In one implementation, the above-described architecture can be used by the contact center 115 for outbound call campaigns. As described below, some countries have carrier messages in a pre-connect stage of the call and the contact center 115 may wish to identify these carrier messages and distinguish them from an answering machine or a human voice. Carrier messages can include messages like the provider is having difficulty making a connection, or the call number is busy, or the call number is not in service, etc. The contact center 115 can map incoming carrier messages to a list of expected results to determine a content of the carrier or other message.

Figure 2:
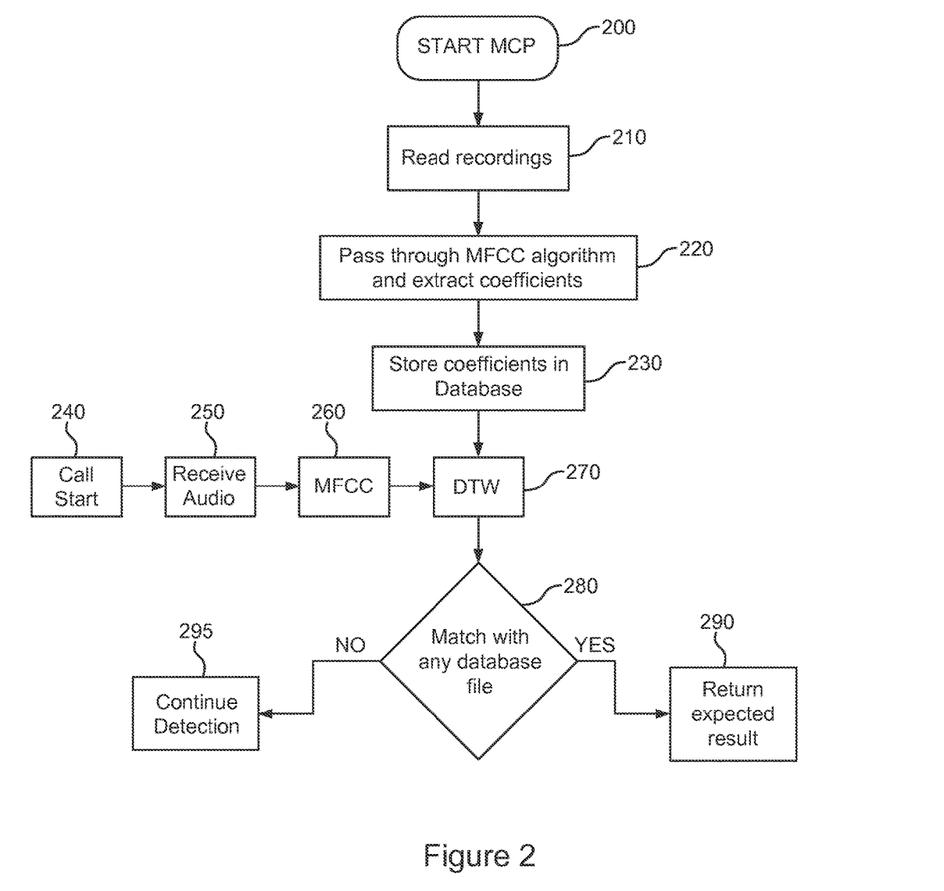
FIG. 2 is a flowchart of an example matching logic for a matching system to detect a voice print of carrier messages during a call.

FIG. 2 is a flowchart of an example matching logic for the matching system to detect a voice print of carrier messages during a call. Carrier message detection can include the process of converting a speech waveform into features, e.g., landmarks, to be used for further processing. The matching logic includes a landmark based matching algorithm, e.g., Mel-frequency cepstral coefficient (MFCC). A media device can utilize Mel-frequency cepstral coefficient over the media channel to match the carrier message. An example media device is the MCP 141 manufactured by GENESYS TELECOMMINATION SYSTEMS, INC. As the MCP 141 starts the matching (200) the carrier message recording can be read (210). The carrier message, and other message, recordings can be saved in various formats, including but not limited to raw audio files, e.g., of pulse code modulation (PCM) signed 16 bit, little Endian, mono format, way, mp3, vox, etc. Additionally or alternatively, any audio format can be converted to raw format using Ffmpeg. The carrier recordings provided by the carriers can be stored in file-based locations, HTTP/HTTPS based locations, etc.

Some examples of carrier messages include the line is busy, the lack of a circuit, the number is no longer in service, the call is being forwarded to an answering machine, etc. The carrier messages are typically provided pre-connection to the called number. Other types of messages that can be matched include post-connect messages, e.g., answering machine messages including please leave your message after the beep. The carrier message and other message recordings are passed through a Mel-frequency cepstral coefficient process to extract coefficients for matching the recordings to the played carrier or other message during connection to the callee (220).

Figure 3:
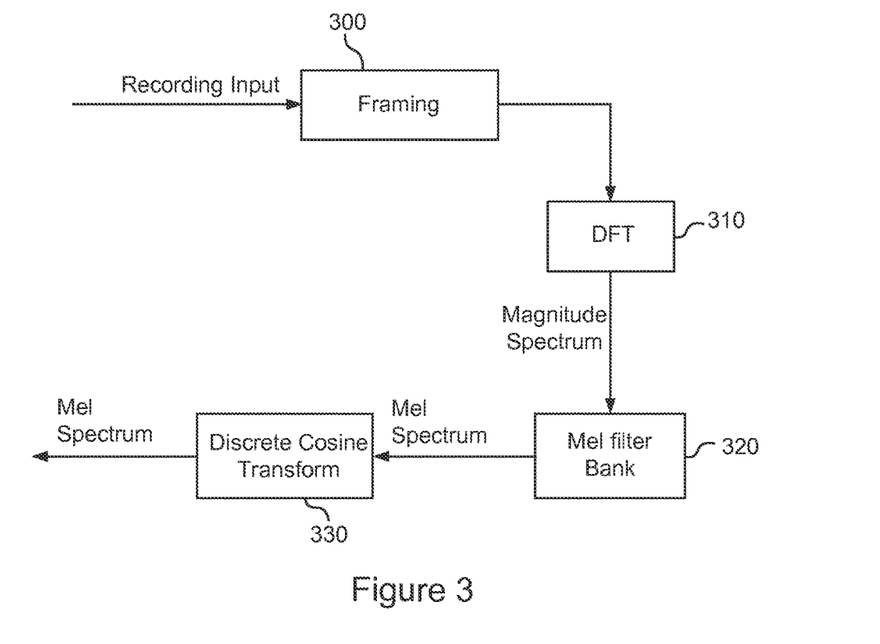
FIG. 3 is a block diagram of an example logic for determining a Mel-frequency cepstral coefficient (MFCC) of recordings.

FIG. 3 is a block diagram of an example logic for determining a Mel-frequency cepstral coefficient (MFCC) of the carrier recordings. The matching system can use the Mel-frequency cepstral coefficient to match a set of known carrier recordings to a received audio message. An example process for determining the Mel-frequency cepstral coefficient is described in the article "Voice Recognition Algorithms using Mel Frequency Cepstral Coefficient (MFCC) and Dynamic Time Warping (DTW)," published by Lindasalwa Muda, Mumtaj Begam and I. Elamvazuthi in Techniques Journal of Computing, Volume 2, Issue 3, March 2010, ISSN 2151-9617.

Generally, the human voice contains much information, including gender, emotion and identity of the speaker. Voice recognition can determine which speaker is present based on the individual's utterance. The Mel-frequency cepstral coefficient is based on human hearing perceptions which cannot perceive frequencies over 1 Khz. Mel-frequency cepstral coefficient is based on the human peripheral auditory system. A subjective pitch is present on Mel-frequency scale to capture characteristics of phonetic in speech. The human perception of the frequency contents of sounds for speech signals do not follow a linear scale. For each tone with an actual frequency T measured in Hz, a subjective pitch is measured on the scale called the Mel scale. The Mel-frequency cepstral coefficient, which is based on variation of the human ear's critical bandwidth with frequency, includes two types of filters which are spaced linearly at low frequency below 1000 Hz and logarithmic spacing above 1000 Hz. The pitch of a 1000 Hz tone, 40 dB above the perceptual hearing threshold, is 1000 MELs. Therefore, MEL scale helps in identifying pitch.

For the recorded input, the voice print can be converted into digital signal form to produce digital data representing each level of signal at every discrete time step. The digitized samples are then processed using the Mel-frequency cepstral coefficient to produce voice features. For example, the voice input recording is divided into frames of N samples having a length of about 20 to 40 ms, more preferably about 40 ms (300). In some implementations about 25 to 100 frames can be used. A discrete Fourier transform (DFT) can be used to compute the fast Fourier transform (FFT) of each frame to convert each frame of samples from the time domain into the frequency domain to determine a magnitude spectrum of the input (310). A bank of filters according to Mel scale can be performed since the frequency range of the magnitude spectrum is wide and the voice signal does not follow a linear scale, to output a Mel spectrum of the input (320). The filters can be band pass filters with bandwidths and spacing roughly equal to those of critical bands and ranges of the center frequencies, which covers the important frequencies for speech perception. The input to the Mel filter bank is the power spectrum for each frame such that for each frame a log spectral energy vector is obtained as output of the Mel filter bank analysis. A discrete Cosine transform can be applied to convert the log Mel spectrum into the time domain to produce a Mel spectrum of the input, e.g., the Mel-frequency cepstral coefficient (330). The cepstral representation of the speech spectrum can provide a good representation of the local spectral properties of the voice print for a given frame. DCT-II can be used for discrete Cosine transform processing because of its energy compaction which results in its coefficients being more concentrated at lower indices than the DFT. In other implementations, windowing can be applied after framing (300) and a delta energy and spectrum can be used after the discrete Cosine transform (330), e.g., as described in the Muda et al. article.

Referring again to FIG. 2, a determined number of coefficients (landmarks) for the frame, e.g., about thirteen coefficients, are stored in the database 131 accessible by the contact center 115 (230). Other amounts of coefficients can be used. For some examples, using about thirteen coefficients helps ensure that the matching process does not take too long. While in use, the MEL coefficients can be stored in memory, e.g., in random access memory (RAM). The MEL coefficients can be recalculated any time the matching logic restarts. If any of the input recordings cannot be found or any additional error occurs during loading an error message can be logged.

At the start of an outbound call (240), e.g., from the contact center 115, the matching logic receives a real-time audio signal, e.g. a message (250). The audio signal may occur pre-connection to the callee. In some examples, the audio signal can include a text or email message converted to audio. The Mel-frequency cepstral coefficient is determined for the audio signal (260), e.g., using the logic described in FIG. 3. The logic divides the real-time audio signal into frames of the same size as the pre-recorded audio signals, e.g. carrier messages or other messages. The determined number of frames are collected from the real-time audio signal, e.g., number of frames for detection, and compared to the carrier message and other message files stored in the database 131 at 230.

A dynamic time warping (DTW) logic, e.g., described in Muda et al., can be used after the Mel-frequency cepstral coefficient to aid with the comparison of the real-time audio signal with the pre-recorded messages (270). The DTW logic is used to select the pattern that matches the recorded carrier message or other message with the real-time data frame. The DTW logic is able to measure similarity between two time series which may vary in time or speed. DTW can compare two dynamic patterns and measure its similarity by calculating a minimum distance between them. This technique is used to find the optimal alignment between two time series if one time series may be warped non-linearly by stretching or shrinking it along its time axis. This warping between two time series can then be used to find corresponding regions between the two time series or to determine the similarity between the two time series.

Figure 4:
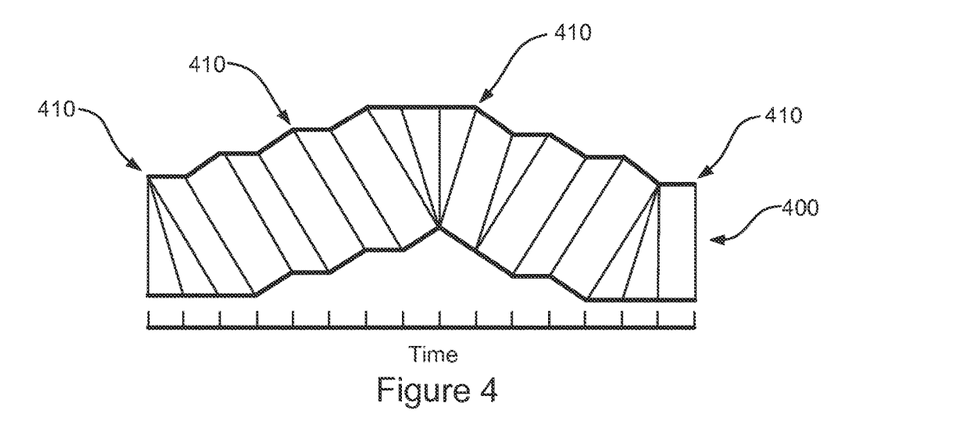
FIG. 4 is a graph illustrating an example of how one times series is warped to another.

FIG. 4 is a graph illustrating an example of how one times series is warped to another. The vertical lines 400 connect a point 410 in one time series to its correspondingly similar point 410 in the other time series. The lines 400 have similar values on the y-axis, but have been separated so the vertical lines between them can be viewed more easily. If both of the time series were identical, all of the lines 400 would be straight vertical lines because no warping would be necessary to line up the two time series, as described in Muda et al. The warp path distance is a measure of the difference between the two time series after they have been warped together, which is measured by the sum of the distances between each pair of points 410 connected by the vertical lines.

Referring also to FIG. 2, the dynamic time warping logic returns the minimal distance between two arrays, the recorded file and the real time data. The voice print matching process determines the pre-recorded file with the smallest distance to the real-time audio, and if the distance is within about 2% of the coefficients range then the arrays are considered a match (280). Other percentage ranges can be used depending on an implementation. The IVR profile can be used to set the percentage, e.g., based on an implementation. Range is calculated as the difference between minimum and maximum Mel-frequency cepstral coefficient through all the frames in the current pre-recording.

Another approach is to check if the smallest distance is lower than an acceptance threshold based on the NULL Mel-frequency cepstral coefficient distance and Standard Deviation (STD). The NULL Mel-frequency cepstral coefficient distance is a dynamic time warping distance between the real-time data and a zeroed array of coefficients. Standard Deviation is a statistical outlier analysis based on mean value and standard deviation of all distances calculated for recorded files, and it can be applied if the number of recoded files is greater than a statistically relevant value, e.g., 10. The standard deviation may not be reliable for a small set of values.

The threshold can include:

Threshold=MatchPercent*NULL_MFCC_Distance when number of recorded files<MinimumFilesForStatistical Analysis (default=10)

Threshold=Mean−StandardDeviation−(0.5*Minimum-Distance) when number of recorded files>=MinimumFiles ForStatisticalAnalysis (default=10)

where:

MatchPercent is a configurable parameter in the range of 0.4 and 0.8, for example;

Default value is 0.7;

MinimumFilesForStatisticalAnalysis is the minimum number of recorded files for applying the statistical outlier analysis. This parameter equals 10.

One example of Voice Print detection uses the 2% approach, but the approaches are selectable, according to the range of MatchPercent parameter:

2% approach: MatchPercent=0.02 (the parser selects this approach when MatchPercent<0.4)

NULL_MFCC & STD: 0.4<=MatchPercent<=0.8.

Initial silence before the first audio signal is not be taken into account, e.g., is ignored.

When the matching system receives the determined number of frames for detection, the real-time data is compared with the pre-recorded data stored in the database 131 or elsewhere, for example (280). If the minimum distance meets the matching criteria, e.g., a best parametric representation of acoustic signals (or landmarks), the matching system reports matching results (290). The pre-recorded carrier message or other message files include expected results. Therefore, if the matching process finds the match for the specific file, the matching process returns the determined result for this file. For example: the result may map to the result "busy." Therefore, if real-time data in the pre-connect mode matches any of this files, the matching system returns the result "busy". An action can occur based on the result. For example, an agent of the contact center 115 is not connected to the call if the carrier message indicates that the line is busy, or an automated call can be disconnected before connecting to the answering machine, e.g., before billing starts. For a campaign outbound calls, waiting until connecting to determine the callee is an answering machine can be costly, but detecting the answering machine, or busy phone line, or disconnected phone line, etc., from audio (not SIP or other signaling) before the call is connected can save time and money.

Additionally or alternatively, there may be a variety of carrier messages, local and foreign, mixed with signals such as a busy tone or ringing. The contact center 115 can blend detected signaling with matching of messages. For example, the contact center 115 on detecting particular message can trigger a specific action and/or provide the contact center 115 with specific information about the call. For example, "sie sind verbunden mit der mailbox von mr. X, bitte hinterlassen sie eine nachricht nach dem piepton" is notifying the contact center 115 that the call is connected with a carrier operated mailbox of the called party, rather than a private answering machine In one example, the contact center 115 can use automated speech recognition to determine a content of the message. From that information the contact center 115 can determine that the called number is correct and store the information about the correct number for future use. Moreover, a matched "invalid or incomplete phone number" message can inform the contact center 115 that the dialed number is wrong, which can trigger a corrective action by the contact center 115. Reaching a pay-per-call destination with a pre-recorded message, which is a likely unintended contact center use, can trigger an action to block the number in calling lists/campaigns of the contact center 115, etc.

When a match of the carrier message occurs, the contact center 115 can store the result of the match for further use. If the match indicates that the call was sent to an answering machine, the contact center 115 can leave a message on the answering machine or call back later depending on an implementation. Otherwise, if there are no matches, the matching system can continue with detection, e.g., post connection (295). The pre and post connections systems can work together or separately, at the same time or one after the other.

In some implementations, IVR profile parameters can be changed in runtime to affect the next call. A sub list of recordings can be used in specified calls, e.g., based on where the call is being placed. Sub list are smaller set of recordings to match with. This list can be determined on the session level via the IVR profile, by the set of results. If some files are not presented in any results list then these files are used during matching process. This can increase performance, e.g., reduce search times and increase accuracy, of the matching system since the system is not using the files that have no expected results, thereby reducing the number of files for matching process.

Figure 5:
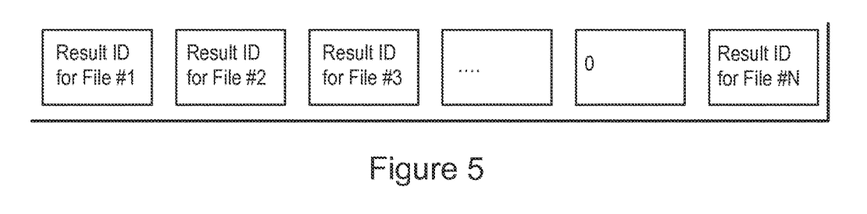
FIG. 5 is a block diagram of an example voice print pre-defined results array.

FIG. 5 is a block diagram of an example voice print pre-defined results array. Results can be stored in various arrays, e.g., one array for pre-connection of the call and one for post-connect. The result array has the size of about 100 and has the result code for the file indexes. The files that have no any result code in their index are not checked for matching. This way the system can create a subset of the files for specific session. In this example, File#N-1 has no result code in the results array, so the matching system does not use the file information in matching process.

If the result list has the file that was not loaded to the matching system, an error message can be logged. If no special result list exists then the matching system can match against all the files and the expected result is <<CUSTOM_1>>. If a result has no corresponding result list, the result is not used and an error message can be logged. An "answering machine" result can be a special matching result. In the case of "answering machine" the result can be postponed until the post-connect mode.

Figure 6:
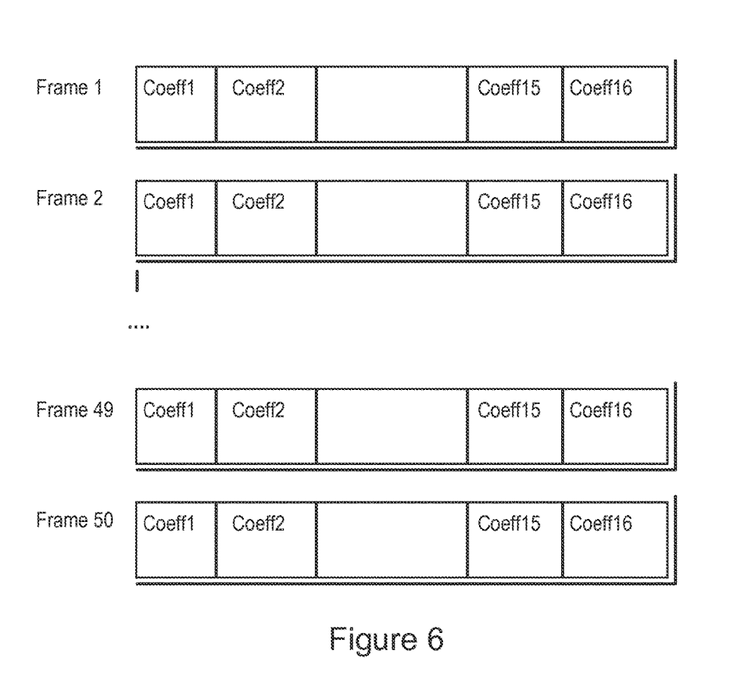
FIG. 6 is a block diagram of an example structure for storing Mel coefficients in a file matrix.

FIG. 6 is a block diagram of an example structure for storing Mel coefficients in a file matrix, e.g., a vector set of sixteen numbers. The voice print database for storing recordings can be built as an array of matrices. When pre-connect mode and post-connect mode are being implemented, the database 131 can include two arrays: one for pre-connect mode and one for post connect mode. Other configurations of arrays are possible. The number of elements in each array is the number of files in configuration. Database 131 has one matrix per file. The number of rows in the matrix is the number of frames for detection. In one implementation, this number equals 25. The number of rows can be configurable. The number of frames for detection determine how fast detect matching can occur. The number of columns is the number of MEL coefficients to store, e.g., 13 coefficients. FIG. 6 shows the structure for one file. The matching logic extracts the sets of coefficients for matching the recorded messages with the real time message to find a match. The matching data can be initialized during startup of the matching system and can be updated on session level.

Recording files can be changed through configuration server 140 or an administrator without restarting the matching system. Files can be added or the file path changed on the detection system level, without changing the IVR profile. List of recorded files is used as master list, smaller sets can be created per call using IVR profile and results list. If during startup one or more configuration files cannot be loaded then the error message can be logged and the expected result for this file cleared so that the file is not taken during the matching process. The matching system can be registered to the updates of these IVR profile parameters and updates can take effect on the next call. If the recorded file has no result in pre-connect mode but has result in post connect mode, then the matching system can postpone returning the result till post-connect mode. Results can be configured on the session level (per call) via IVR profile and global results can be set on the matching system level. Configuration parameters can be configured via the IVR 119. The carrier messages detection can work in parallel with other call progress detections. If there is no match to any file, the detection system can continue call progress detection without the carrier messages detection system.

The systems and methods described above may be implemented in many different ways in many different combinations of hardware, software firmware, or any combination thereof. For example, the systems and methods can be used for inbound calls, outbound calls, both inbound and outbound calls, etc. The systems and methods can be used pre-connection to the callee, post connection, both pre and post connection, etc.

In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, it can be apparent that many more embodiments and implementations are possible. Accordingly, the embodiments are not to be restricted.

The invention claimed is:

1. A contact center system, comprising:
an outbound server device configured to make a call to a callee; and
a media device configured to:
receive an audio signal based on the call;
determine a Mel-frequency cepstral coefficient for the received audio signal;
match the Mel-frequency cepstral coefficient for the audio signal to a Mel-frequency cepstral coefficient for a pre-recorded carrier message;
determine a content of the audio signal based on the match;
distinguish the match based on a stage of the call in which the match occurred; and
take an action based on the content of the audio signal and the stage of the call in which the match occurred.

2. The contact center of claim 1, wherein the stage is a pre-connection stage where the media device matches the audio signal to the pre-recorded carrier message pre-connection to the callee.

3. The contact center of claim 1, where the media device further divides the audio signal into frames of a same size as the pre-recorded carrier message before the match.

4. The contact center of claim 1, where the media device receives the audio signal in real-time.

5. The contact center of claim 1, further comprising a database connected with the media device, the database to store the Mel-frequency cepstral coefficient for the pre-recorded carrier message.

6. The contact center of claim 1, where media device receives the audio signal over a media channel.

7. The contact center of claim 1, where the media device comprises a media control platform.

8. The contact center of claim 1, where the pre-recorded carrier message comprises at least one of a line is busy, a lack of a circuit, a number is no longer in service, and a call is being forwarded to an answering machine.

9. The contact center of claim 1, where the media device further performs a dynamic time warping after the Mel-frequency cepstral coefficient to aid with a comparison of the audio signal with the pre-recorded carrier message.

10. A contact center system, comprising:
an outbound server device configured to make a call to a callee; and
a media device configured to:
receive an audio signal based on the call;
determine a Mel-frequency cepstral coefficient for the received audio signal;
match the Mel-frequency cepstral coefficient for the audio signal to a Mel-frequency cepstral coefficient for a pre-recorded carrier message; and
determine a content of the audio signal based on the match,
wherein the media device is further configured to divide a voice input into frames, perform a discrete Fourier transform to compute the fast Fourier transform of each frame to convert each frame of samples from a time domain into a frequency domain to determine a magnitude spectrum of the voice input, perform a filter according to Mel scale to output a log Mel spectrum of the voice input, and apply a discrete Cosine transform to convert the log Mel spectrum into the time domain to determine the Mel-frequency cepstral coefficient of the pre-recorded carrier message.

11. A computer implemented method, comprising:
making an outbound call to a callee;
receiving an audio signal based on the outbound call, to determine a Mel-frequency cepstral coefficient for the received audio signal;
matching the Mel-frequency cepstral coefficient for the audio signal to a Mel-frequency cepstral coefficient for a pre-recorded carrier message;
determining a content of the audio signal based on the match;
distinguishing the match based on a stage of the call in which the match occurred; and
taking an action based on the content of the audio signal and the stage of the call in which the match occurred.

12. The computer implemented method of claim 11, wherein the stage is a pre-connection stage wherein the audio signal is matched to the pre-recorded carrier message pre-connection to the callee.

13. The computer implemented method of claim 12, further comprising continuing with detection post connection if there are no matches.

14. The computer implemented method of claim 11, further comprising dividing the audio signal into frames of a same size as the pre-recorded carrier message before the matching.

15. The computer implemented method of claim 11, further comprising receiving the audio signal in real-time.

16. The computer implemented method of claim 11, further comprising receiving the audio signal over a media channel.

17. The computer implemented method of claim 11, where the pre-recorded carrier message comprises at least one of a line is busy, a lack of a circuit, a number is no longer in service, and a call is being forwarded to an answering machine.

18. The computer implemented method of claim 11, further comprising dynamic time warping after the Mel-frequency cepstral coefficient to aid with a comparison of the audio signal with the pre-recorded carrier message.

19. A computer implemented method, comprising:
determining a Mel-frequency cepstral coefficient for a pre-recorded carrier message, wherein the determining includes, dividing a voice input into frame, performing a discrete Fourier transform to compute the fast Fourier transform of each frame to convert each frame of samples from a time domain into a frequency domain to determine a magnitude spectrum of the voice input, performing a filter according to Mel scale to output a log Mel spectrum of the voice input, and applying a discrete Cosine transform to convert the log Mel spectrum into the time domain to determine the Mel-frequency cepstral coefficient of the pre-recorded carrier message;

making an outbound call to a callee;

receiving an audio signal based on the outbound call, to determine a Mel-frequency cepstral coefficient for the received audio signal;

matching the Mel-frequency cepstral coefficient for the audio signal to a Mel-frequency cepstral coefficient for a pre-recorded carrier message; and determining a content of the audio signal based on the match.

20. The computer implemented method of claim 11, further comprising storing the Mel-frequency cepstral coefficient for the pre-recorded carrier message in a database.

21. The computer implemented method of claim 1, wherein the stage is detected as a post-connect stage wherein the call is answered by an answering machine or a human.

22. The computer implemented method of claim 1, wherein the action is disconnecting the call without routing the call to a contact center agent.

23. The computer implemented method of claim 1, wherein the action is leaving a message on an answering machine.

* * * * *